US009184799B2

(12) United States Patent
Jang et al.

(10) Patent No.: US 9,184,799 B2
(45) Date of Patent: Nov. 10, 2015

(54) SMART NFC ANTENNA MATCHING NETWORK SYSTEM AND USER DEVICE INCLUDING THE SAME

(71) Applicants: Yohan Jang, Gyeonggi-do (KR); Iljong Song, Gyeonggi-do (KR); Hyounghwan Roh, Seoul (KR)

(72) Inventors: Yohan Jang, Gyeonggi-do (KR); Iljong Song, Gyeonggi-do (KR); Hyounghwan Roh, Seoul (KR)

(73) Assignee: Samsung Electronics Co., Ltd (KR)

(*) Notice: Subject to any disclaimer, the term of this patent is extended or adjusted under 35 U.S.C. 154(b) by 27 days.

(21) Appl. No.: 14/098,063

(22) Filed: Dec. 5, 2013

(65) Prior Publication Data

US 2014/0154980 A1 Jun. 5, 2014

(30) Foreign Application Priority Data

Dec. 5, 2012 (KR) ........................ 10-2012-0140389

(51) Int. Cl.
*H04B 5/00* (2006.01)

(52) U.S. Cl.
CPC ............ *H04B 5/0025* (2013.01); *H04B 5/0031* (2013.01); *H04B 5/0056* (2013.01); *H04B 5/0087* (2013.01)

(58) Field of Classification Search
CPC .................................................... H04B 5/0025
USPC ...................... 455/41.1, 41.2, 78, 90.3, 562.1
See application file for complete search history.

(56) References Cited

U.S. PATENT DOCUMENTS

| | | | | |
|---|---|---|---|---|
| 8,736,495 | B2 * | 5/2014 | Cho | 343/702 |
| 2010/0117454 | A1 | 5/2010 | Cook et al. | |
| 2011/0266883 | A1 | 11/2011 | Eray | |
| 2012/0075148 | A1 | 3/2012 | Cho | |
| 2013/0027078 | A1 * | 1/2013 | Nakano et al. | 324/764.01 |

FOREIGN PATENT DOCUMENTS

| | | |
|---|---|---|
| JP | 2005323019 | 11/2005 |
| JP | 2006302219 | 11/2006 |
| JP | 2009075966 | 4/2009 |
| JP | 2011086009 | 4/2011 |
| KR | 1020100132724 | 12/2010 |
| KR | 1020110035196 | 4/2011 |
| KR | 101080651 | 11/2011 |

* cited by examiner

*Primary Examiner* — Tuan H Nguyen
(74) *Attorney, Agent, or Firm* — The Farrell Law Firm, P.C.

(57) ABSTRACT

A Near Field Communication (NFC) antenna matching network system is provided for connection with an NFC. The NFC antenna matching network system includes a source coil connected between a first terminal and a second terminal of the NFC transceiver; and a resonant coil physically separated from the source coil.

33 Claims, 14 Drawing Sheets

1000

300 I/O Block
100 GSM Block
101
400 Application Block
200 NFC Transceiver
230 NFC AMNS
500 Memory
600 Display

SMART NFC ANTENNA MATCHING NETWORK SYSTEM AND USER DEVICE INCLUDING THE SAME

PRIORITY

This application claims priority under 35 U.S.C. §119 to Korean Patent Application No. 10-2012-0140389, which was filed in the Korean Intellectual Property Office on Dec. 5, 2012, the entire content of which is hereby incorporated by reference.

BACKGROUND

1. Field of the Invention

The present invention relates generally to a wireless communication device, and more particularly, to a Near Field Communication (NFC) device.

2. Description of the Related Art

An NFC scheme is a type of Radio Frequency IDentification (RFID) technology and may use a frequency (e.g., 13.56 MHz) of a high frequency band and transmit data at a distance with low power. An example of an NFC scheme has been standardized in International Organization for Standardization/International Electrotechnical Commission (ISO/IEC) 18092. An NFC scheme performs short distance radio communication using various frequency signals, e.g., 125, 135, and 900 kHz, in addition to the 13.56 MHz.

Accordingly, an NFC device may have such advantages of communicating or being compatible with existing information devices, including portable wireless terminals and notebook computers through exchanges of address books, game and MP3 files. Further, an NFC device using a predetermined frequency band is already in use for public transportation and mobile phone payment.

A mobile phone embedded with NFC chips is still in an early distribution stage, although NFC technology is expected to be widely adopted in mobile terminals, such as portable wireless terminals, in the near future.

SUMMARY

An aspect of the present invention is to provide an NFC antenna matching network system, which is connected with an NFC transceiver.

Another aspect of the present invention is to provide a user device utilizing an NFC antenna matching network system.

In accordance with an aspect of the present invention, an NFC antenna matching network system is provided, which includes a source coil connected between a first terminal and a second terminal of the NFC transceiver; and a resonant coil physically separated from the source coil.

In accordance with another aspect of the present invention, a user device is provided, which includes an NFC transceiver; and an NFC antenna matching network system connected with the NFC transceiver. The NFC transceiver includes a first terminal; a second terminal; and a reader that is connected to the first terminal and the second terminal. The NFC antenna matching network system includes a first capacitor having a first end connected with the first terminal; a second capacitor having a first end connected with the second terminal; a source coil having connected between a second end of the first capacitor and a second end of the second capacitor; and a parallel resonator physically separated from the source coil.

In accordance with another aspect of the present invention a user device is provided, which includes an NFC transceiver; and an NFC antenna matching network system. The NFC transceiver includes a first terminal; a second terminal; a reader that is connected with the first terminal and the second terminal; and a card circuit that is connected with the first terminal and the second terminal. The NFC antenna matching network system includes a first capacitor having a first end connected with the first terminal; a second capacitor having a first end connected with the second terminal; a source coil connected between a second end of the first capacitor and a second end of the second capacitor; and a parallel resonator physically separated from the source coil. The parallel resonator includes a resonant coil; and a third capacitor connected between a first end and a second end of the resonant coil.

In accordance with another aspect of the present invention, a user device is provided, which includes an NFC transceiver; and an NFC antenna matching network system. The NFC transceiver includes a first terminal; a second terminal; a third terminal; a fourth terminal; a reader connected with the first terminal and the second terminal; and a card circuit connected with the third terminal and the fourth terminal. The NFC antenna matching network system includes a first capacitor having a first end connected with the first terminal and the third terminal; a second capacitor having a first end connected with the second terminal and the fourth terminal; a source coil connected between a second end of the first capacitor and a second end of the second capacitor; and a parallel resonator physically separated from the source coil. The parallel resonator includes a resonant coil; and a third capacitor connected between a first end and a second end of the resonant coil.

In accordance with another aspect of the present invention, a user device is provided, which includes an NFC transceiver; and an NFC antenna matching network system. The NFC transceiver includes a first terminal; a second terminal; a third terminal; a fourth terminal; a fifth terminal; a reader connected with the first terminal, the second terminal, and the third terminal; and a card circuit connected with the fourth terminal and the fifth terminal. The NFC antenna matching network system includes a first capacitor having a first end connected with the first terminal and the fourth terminal; a second capacitor having a first end connected with the second terminal and the fifth terminal; a source coil having a first end connected with a second end of the first capacitor, and having a second end connected with a second end of the second capacitor and the third terminal; and a parallel resonator physically separated from the source coil. The parallel resonator includes a resonant coil; and a third capacitor connected between a first end and a second end of the resonant coil.

BRIEF DESCRIPTION OF THE FIGURES

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
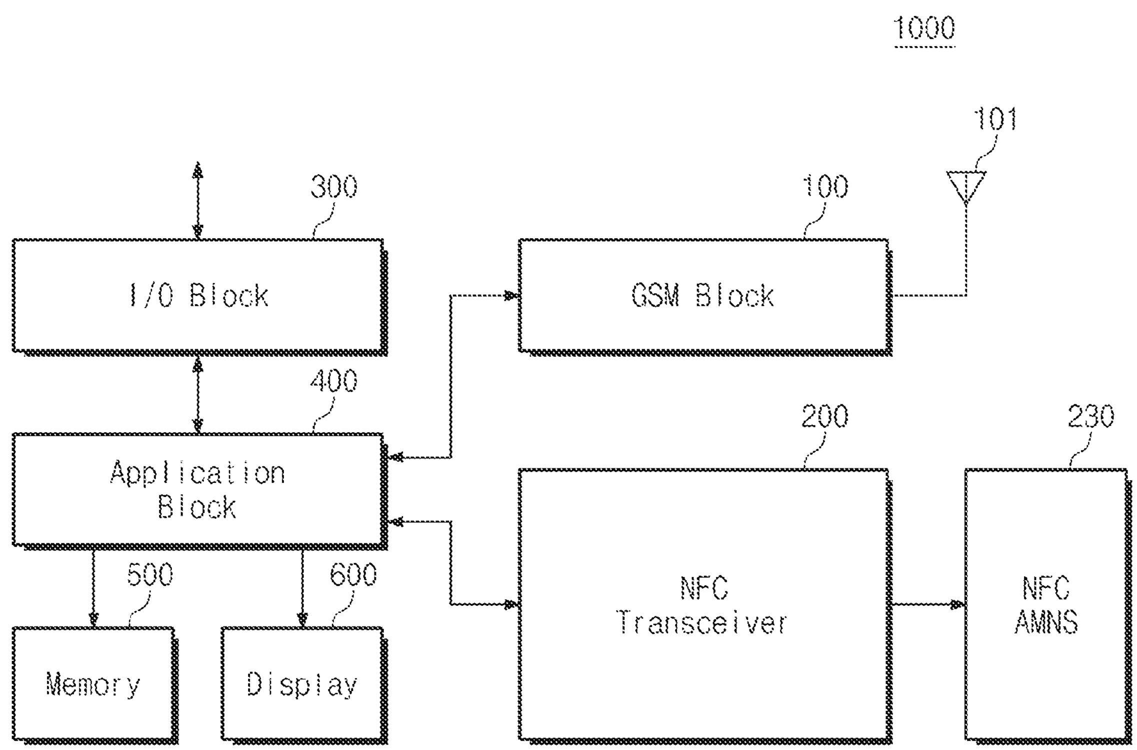
FIG. 1 is a block diagram illustrating a device according to an embodiment of the present invention.

Various embodiments of the present invention will be described in detail below with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a device according to an embodiment of the present invention. For example, the device illustrated in FIG. 1 may be a mobile phone, but is not limited thereto.

Referring to FIG. 1, a mobile phone 1000 includes an antenna 101, a Global System for Mobile Communication (GSM) block 100, an NFC transceiver 200, an NFC antenna matching network system 230, an Input/Output (I/O) block 300, an application block 400, a memory 500, and a display 600. The mobile phone 100 may include more or fewer components/blocks.

Further, although the mobile phone 1000 is described herein using GSM technology, the mobile phone 1000 may also be implemented using other technologies such as Code Division Multiple Access (CDMA), etc.

The blocks illustrated in FIG. 1 may be implemented in an Integrated Circuit (IC) form. Alternatively, some of the blocks may be implemented as an IC form, while other blocks may be in a discrete form.

The GSM block 100 is connected to the antenna 101, and provides wireless telephone operations. For example, the GSM block 100 includes a receiver and a transmitter (not shown) to perform corresponding receiving and transmitting operations.

The NFC transceiver 200, which may use inductive coupling for wireless communication, is configured to receive and transmit NFC signals. The NFC transceiver 200 provides NFC signals to an NFC antenna matching network system 230, which transmits NFC signals through inductive coupling. The NFC antenna matching network system 230 receives NFC signals (e.g., provided from another NFC device (not shown)), and provides the received NFC signals to the NFC transceiver 200.

The NFC transceiver 200 may operate according to specifications described in NFC Interface and Protocol-1 (NFCIP-1) and NFC Interface and Protocol-2 (NFCIP-2) and standardized in European Computer Manufacturing Association (ECMA)-340, ISO/IEC 18092, ETSI TS 102 190, ISO 21481, ECMA 352, European Telecommunications Standards Institute (ETSI) Technical Standard (TS) 102 312, etc.

The application block 400 includes corresponding hardware circuitry (e.g., one or more processors), and provides various user applications provided by the mobile phone 1000. For example, the user applications include voice call operations, data transfers, etc. The application block 400 operates in conjunction with the GSM block 100 to provide such features.

The display 600 displays images in response to the corresponding display signals received from the application block 400. For example, the images may be generated by a camera provided in mobile phone 1000, but not illustrated in FIG. 1. The display 600 may include a memory (e.g., a frame buffer) for temporary storage of pixel values for image refresh purposes, and may be implemented, for example, as a Liquid Crystal Display (LCD) screen with associated control circuits.

The I/O block 300 provides a user with the facility to provide inputs, for example, to dial numbers. In addition, the I/O block 300 may provide outputs that are received via the application block 400.

The memory 500 stores program (instructions) and/or data used by the applications block 400, and may be implemented as a Random Access Memory (RAM), a Read Only Memory (ROM), flash memory, etc. Thus, the memory 500 may include volatile as well as non-volatile storage elements.

The NFC antenna matching network system 230 communicates with external devices by inductive coupling, and is used for both transmission and reception of NFC signals. For example, transmission and reception of NFC signals by the NFC transceiver 200 may be performed in a Time Division Multiplexed (TDM) manner. Accordingly, a time interval in which the NFC transceiver 200 transmits NFC signals may be referred to as a transmit interval, and the corresponding mode of operation of the NFC transceiver 200 may be referred to as a "transmit mode" or "NFC reader transmit mode". Similarly, a time interval in which the NFC transceiver 200 receives NFC signals may be referred to as a receive interval, and the corresponding mode of operation of the NFC transceiver 200 may be referred to as a "receive mode" or "NFC tag receive mode".

Figure 2A:
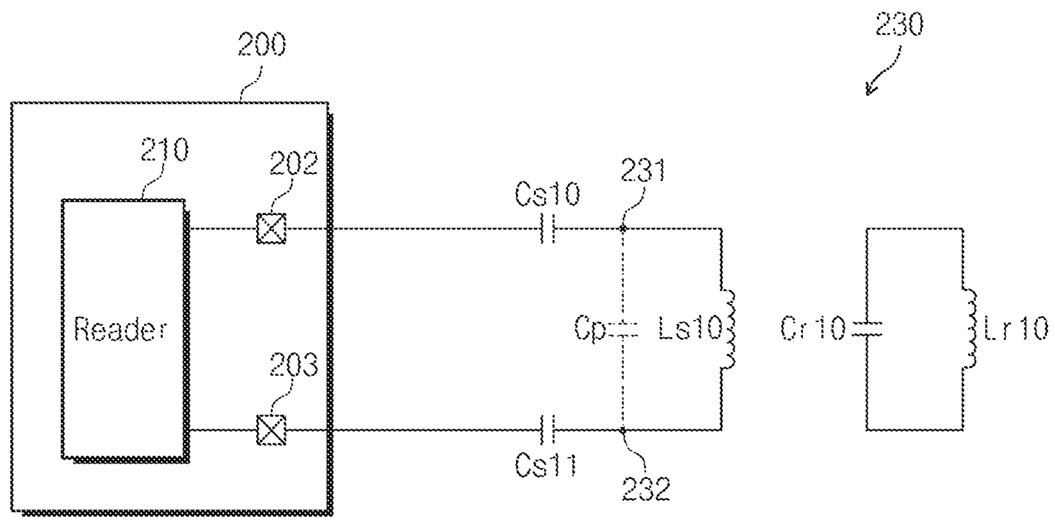
FIGS. 2A to 2F are diagrams schematically illustrating NFC antenna matching network systems according to embodiments of the present invention.

FIG. 2A is a diagram schematically illustrating an NFC antenna matching network system according to an embodiment of the present invention.

Referring to FIG. 2A, the smart NFC antenna matching network system 230 includes capacitors Cs10, Cs11, and Cr10 and inductors Ls10 and Lr10. The smart NFC antenna matching network system 230 is electrically connected with chip terminals 202 and 203 of the NFC transceiver 200. In FIG. 2A, the NFC transceiver 200 includes a reader 210 connected with the chip terminals 202 and 203. However, the inventive concept is not limited thereto.

The capacitor Cs10 is connected between the chip terminal 202 and an antenna terminal 231, and the capacitor Cs11 is connected between the chip terminal 203 and an antenna terminal 232. As a source coil, an inductor Ls10 is connected between the antenna terminals 231 and 232. The inductor Ls10 and the capacitors Cs10 and Cs11 form a serial resonator. Herein, the inductor Ls10 may be referred to as a source coil.

The capacitor Cr10 and the inductor Lr10 form a parallel resonator.

As illustrated in FIG. 2A, the parallel resonator formed of the capacitor Cr10 and the inductor Lr10 is physically separated from the serial resonator that is electrically connected with the chip terminals 202 and 203. Herein, the inductor Lr10 may be referred to as a resonant coil.

The source coil is physically separated from the resonant coil. That is, the resonant coil Lr10 is electrically floated from the source coil Ls10. Accordingly, the source coil Ls10 may be supplied with power from the reader 210, and the resonant coil Lr10 may be supplied with power from the source coil Ls10 by magnetic induction. The resonant coil Lr10 transmits or receives NFC signals by parallel resonance.

Herein, the capacitor Cr10 connected in parallel with the resonant coil Lr10 may be a lumped element or parasite capacitance parasitized on the resonant coil Lr10.

Additionally, as illustrated by a dotted line in FIG. 2A, a capacitor Cp may be connected in parallel between the antenna terminals 231 and 232 through the capacitors Cs10 and Cs11. That is, the capacitor Cp may be selectively used.

In a transmission mode of the NFC transceiver 200, the source coil Ls10 (or the inductance of the source coil Ls10) and the capacitors Cs10 and Cs11 form a serial resonator. When a current supplied from the reader 210 flows to the source coil Ls10, a magnetic field is generated around the source coil Ls10. The magnetic field formed at the source coil Ls10 allows an induced current to flow at the resonant coil Lr10 being floated. That is, the resonant coil Lr10 is supplied with power from the source coil Ls10 through magnetic induction.

Capacitance of the capacitor Cr10 and inductance of the resonant coil Lr10 may resonate with a center frequency (e.g., 13.56 MHz) of a band of frequencies occupied by an NFC signal output from the reader 210 according to power supplied through magnetic induction.

Further, in the transmission mode of the NFC transceiver 200, the reader 210 transmits NFC signals through the chip terminals 202 and 203.

In a reception mode of the NFC transceiver 200, the source coil Ls10 (or the inductance of the source coil Ls10) and the capacitors Cs10 and Cs11 form a serial resonator. The parallel resonator formed from the resonant coil Lr10 and the capacitor Cr10 resonate with an NFC signal transmitted from an external NFC device. An induced current flows at the source coil Ls10 by a magnetic field formed around the resonant coil Lr10. That is, the source coil Ls10 is supplied with power from the resonant coil Lr10 through magnetic induction.

NFC signals received via the parallel resonator are provided to the reader 210 via the serial resonator formed by the capacitors Cs10 and Cs11 and the source coil Ls10.

Further, in the reception mode of the NFC transceiver 200, the reader 210 receives NFC signals via the chip terminals 202 and 203.

In a typical NFC antenna matching network system, capacitors for serial resonance and capacitors for parallel resonance are electrically connected with an antenna. However, in the typical case, the capacitors for serial resonance may be affected by the capacitors for parallel resonance in terms of impedance, or the capacitors for parallel resonance may be affected by the capacitors for serial resonance in terms of impedance. This influence often lowers transfer performance (or a quality factor) of the typical NFC antenna matching network system.

However, a smart NFC antenna matching network system, i.e., the NFC antenna matching network system 230 according to an embodiment of the preset invention, transmits and receives NFC signals under a condition where a serial resonator suitable for a transmission mode (i.e., advantageous to form a magnetic field) and a parallel resonator suitable for a reception mode (i.e., advantageous to be supplied with a power) are physically separated, as illustrated in FIG. 2A. In this case, the serial resonator and the parallel resonator do not influence each other in terms of impedance.

Accordingly, compared with a typical NFC antenna matching network system, impedance seen from the resonant coil Lr10 is relatively low.

Basically, because the resonant coil Lr10 is floated, i.e., physically separated from the source coil Ls10, impedance of the source coil Ls10 is reduced. Further, as impedance is reduced, the amount of current flowing via the source coil Ls10 may increase relatively. Consequently, the strength of current induced at the resonant coil Lr10 (or the strength of a magnetic field) increases. Further, as the strength of current induced or the strength of a magnetic field increases, a recognition distance or a reception voltage increases.

Figure 2B:
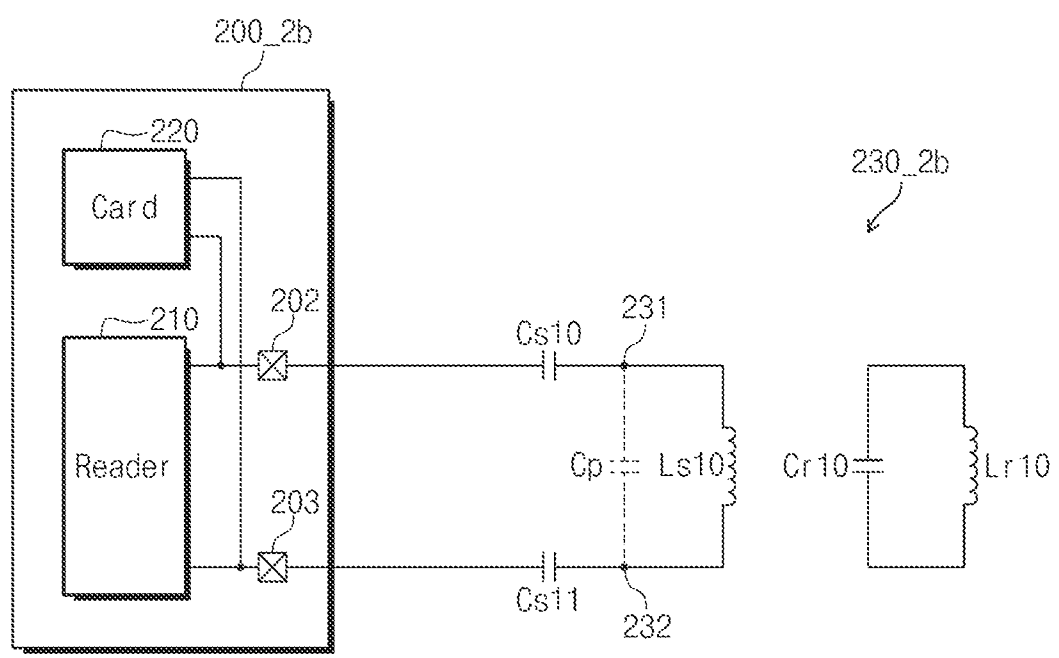

FIG. 2B is a diagram schematically illustrating an NFC antenna matching network system according to an embodiment of the present invention.

Referring to FIG. 2B, a smart NFC antenna matching network system **230_2*b* includes capacitors Cs10, Cs11, and Cr10 and inductors Ls10 and Lr10. The capacitors Cs10, Cs11, and Cr10 and the inductors Ls10 and Lr10 are connected substantially the same as illustrated in FIG. 2**A, and a detailed description thereof is thus omitted.

Additionally, the NFC transceiver **200_2*b* further includes a reader 210 and a card circuit 220. As described in conjunction with FIG. 2A, the reader 210 is connected with a smart NFC antenna matching network system 230_2*b* through chip terminals 202 and 203**.

In a transmission mode of the NFC transceiver **200_2*b*, the reader 210 transmits NFC signals via the chip terminals 202 and 203. In a reception mode of the NFC transceiver 200_2*b*, the reader 210 receives NFC signals via the chip terminals 202 and 203**.

Further, the card circuit 220 is connected with the smart NFC antenna matching network system **230_2*b* via the chip terminals 202 and 203. Basically, the NFC transceiver 200_2*b* is substantially the same as the NFC transceiver 200 illustrated in FIG. 2A, except that the card circuit 220 is configured to share the chip terminals 202 and 203 with the reader 210**.

Figure 2C:
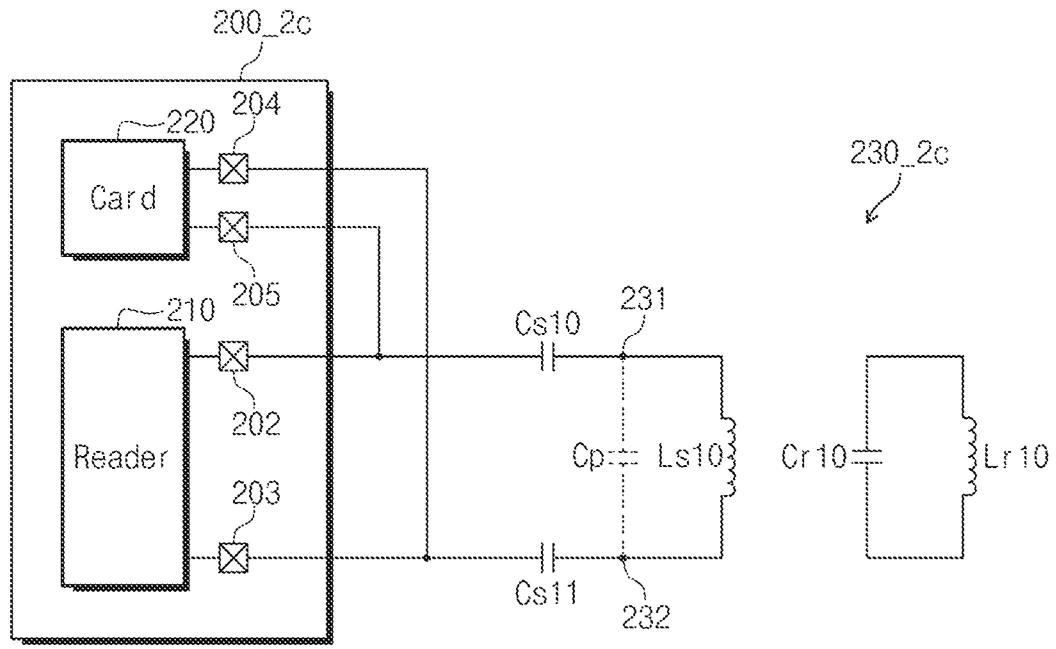

FIG. 2C is a diagram schematically illustrating an NFC antenna matching network system according to an embodiment of the present invention.

Referring to FIG. 2C, a smart NFC antenna matching network system **230_2*c* includes capacitors Cs10, Cs11, and Cr10 and inductors Ls10 and Lr10. The capacitors Cs10, 0511, and Cr10 and the inductors Ls10 and Lr10 are connected substantially the same as illustrated in FIG. 2**A, and a detailed description thereof is thus omitted.

An NFC transceiver **200_2*c* includes a reader 210 and a card circuit 220. As described in FIG. 2A, the reader 210 is connected with a smart NFC antenna matching network system 230_2*c* through chip terminals 202 and 203. In a transmission mode of the NFC transceiver 200_2*c*, the reader 210 transmits NFC signals via the chip terminals 202 and 203, and in a reception mode of the NFC transceiver 200_2*c*, the reader 210 receives NFC signals via the chip terminals 202 and 203. The card circuit 220 is connected with the smart NFC antenna matching network system 230_2*c* via chip terminals 204 and 205. Thus, the NFC transceiver 200_2*c* is substantially the same as the NFC transceiver 200 illustrated in FIG. 2A, except that the card circuit 220 and the reader 210 are connected with the NFC antenna matching network system 230_2*c* via independent chip terminals 202, 203, 204, and 205**.

Although not illustrated, the chip terminals 204 and 205 may be connected with antenna terminals 231 and 232, respectively.

Figure 2D:
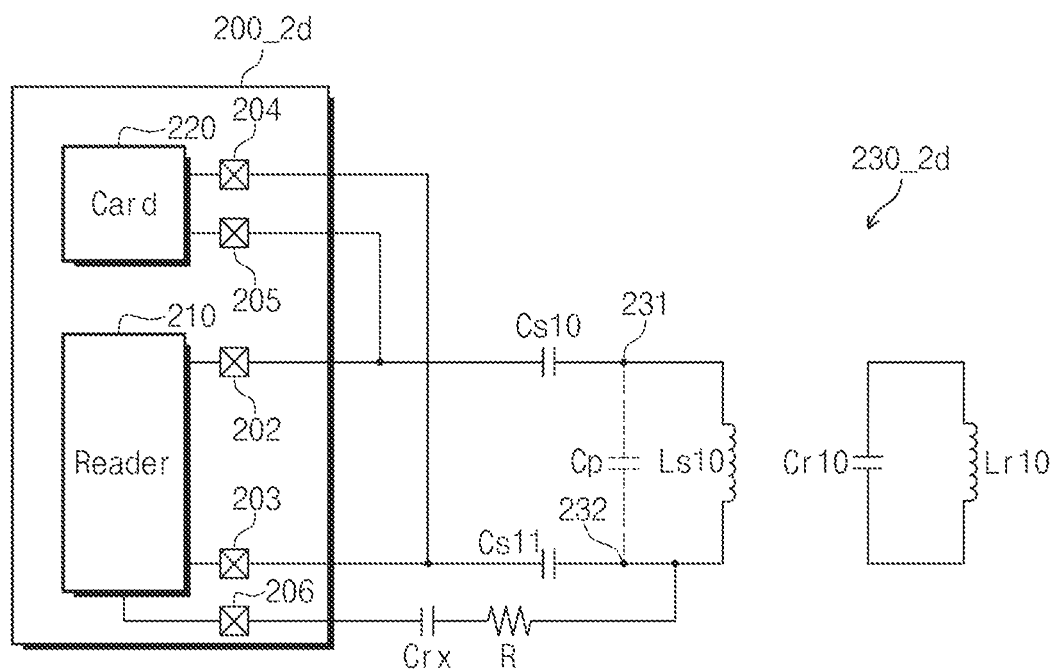

FIG. 2D is a diagram schematically illustrating an NFC antenna matching network system according to an embodiment of the present invention.

Referring to FIG. 2D, a smart NFC antenna matching network system **230_2*d* includes capacitors Cs10, Cs11, and Cr10 and inductors Ls10 and Lr10. The capacitors Cs10, Cs11, and Cr10 and the inductors Ls10 and Lr10 are connected substantially the same as illustrated in FIG. 2**A, and a detailed description thereof is thus omitted.

An NFC transceiver **200_2*d* includes a reader 210 and a card circuit 220. The reader 210 is connected with the smart NFC antenna matching network system 230_2*d* through chip terminals 202, 203, and 206. In a transmission mode of the NFC transceiver 200_2*d*, the reader 210 transmits NFC signals via the chip terminals 202 and 203, and in a reception mode of the NFC transceiver 200_2*d*, the reader 210 receives NFC signals via the chip terminal 206. The card circuit 220 is connected with the smart NFC antenna matching network system 230_2*d* via chip terminals 204 and 205. A capacitor Crx and a resistor R are connected between the antenna terminal 232 and the chip terminal 206**.

Figure 2E:
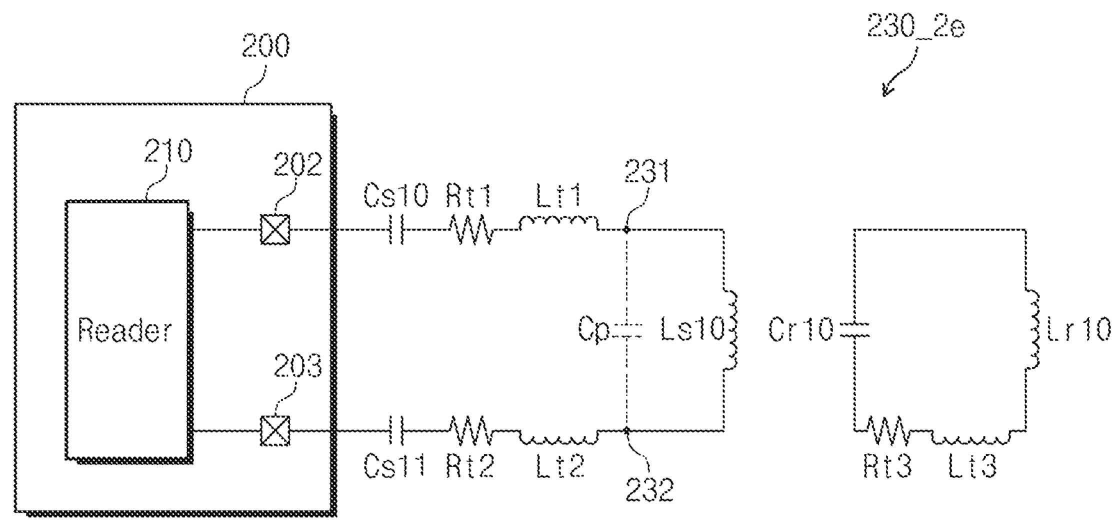

FIG. 2E is a diagram schematically illustrating an NFC antenna matching network system according to an embodiment of the present invention.

Referring to FIG. 2E, a smart NFC antenna matching network system **230_2*e* include capacitors Cs10, Cs11, and Cr10, inductors Ls10, Lr10, Lt1, Lt2, and Lt3, and resistors Rt1, Rt2, and Rt3. The smart NFC antenna matching network system 230_2*e* in FIG. 2E is substantially the same as the NFC antenna matching network system 230 illustrated in FIG. 2A, except for the additional inductors Lt1, Lt2, and Lt3, and resistors Rt1, Rt2, and Rt3**.

More specifically, the resistor Rt1 and the inductor Lt1 are connected in series between an antenna terminal 231 and a capacitor Cs10. The resistor Rt2 and the inductor Lt2 are connected in series between an antenna terminal 232 and a capacitor Cs11. Herein, the resistors Rt1 and Rt2 and the inductors Lt1 and Lt2 are used to tune impedance matching, a bandwidth, a Q value, etc. In some cases, the resistors Rt1 and Rt2 may be removed. For example, the resistors Rt1 and Rt2 or the inductors Lt1 and Lt2 may be used to tune impedance matching, a bandwidth, or a Q value.

The resistor Rt3 and the inductor Lt3 are connected in series between the inductor Lr10 as a resonant coil and the capacitor Cr10. As described above, the resistor Rt3 or the inductor Lt3 may be used to tune impedance matching, a bandwidth, or a Q value. Different combinations of resistors and inductors may be made variously to tune impedance matching, a bandwidth, or a Q value.

Although not illustrated, resistors and/or inductors used to tune impedance matching, a bandwidth, or a Q value are also applicable to smart NFC antenna matching network systems as illustrated in FIGS. 2B to 2D.

Figure 2F:
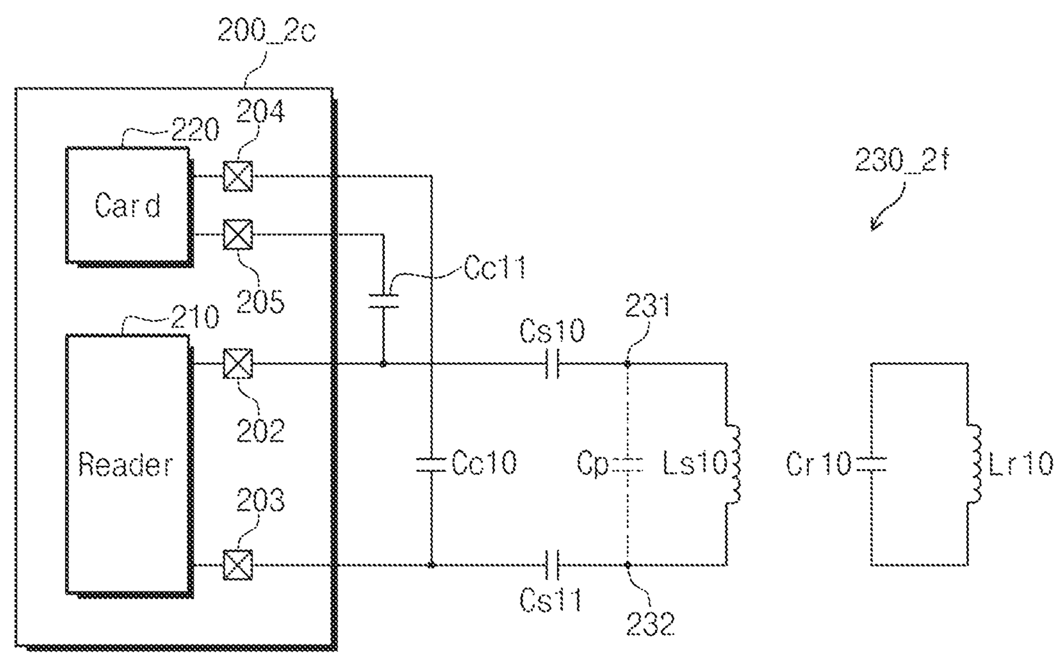

FIG. 2F is a diagram schematically illustrating an NFC antenna matching network system according to an embodiment of the present invention.

Referring to FIG. 2F, a smart NFC antenna matching network system **230_2*f* includes capacitors Cs10, 0511, Cr10, Cc10, and Cc11 and inductors Ls10 and Lr10. The smart NFC antenna matching network system 230_2*f* in FIG. 2F is substantially the same as the NFC antenna matching network system 230_2*c* illustrated in FIG. 2C, except for Cc10 and Cc11**, and a description thereof is thus omitted.

The capacitor Cc10 is connected between a chip terminal 204 and one terminal of the capacitor Cs11 (adjacent to a chip terminal 203), and the capacitor Cc11 is connected between a chip terminal 205 and one terminal of the capacitor Cs10 (adjacent to a chip terminal 202). However, the connections between the chip terminals 204 and 205 and the smart NFC antenna matching network system **230_2*f*** is not limited to this disclosure.

FIGS. 3 to 6 are diagrams illustrating a source coil and a resonant coil according to embodiments of the present invention. As described above, a smart NFC antenna matching network system 230 according to an embodiment of the present invention includes a source coil Ls10 and a resonant coil Lr10. Below, various shapes of the source coil Ls10 and the resonant coil Lr10 will be more fully described with reference to FIGS. 3 to 6.

Figure 3:
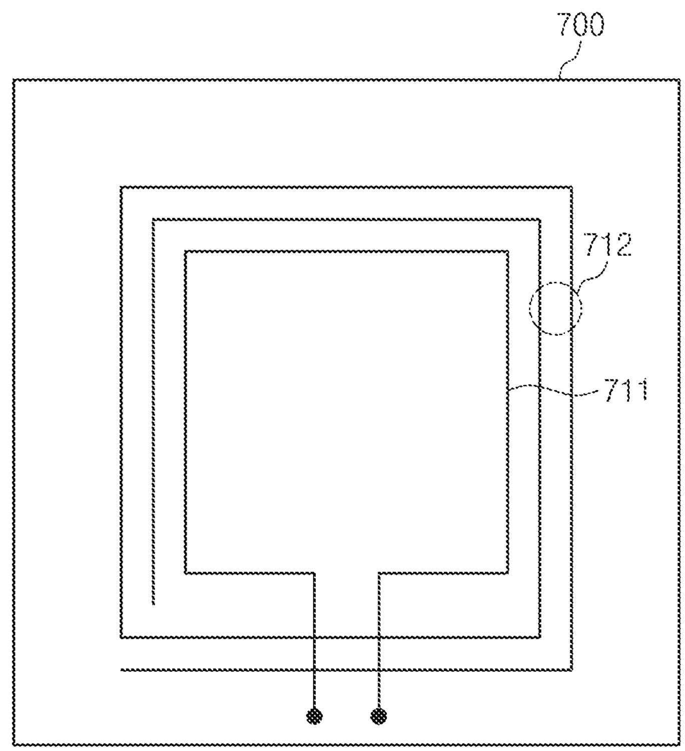
FIGS. 3 to 6 are diagrams illustrating a source coil and a resonant coil according to embodiments of the present invention.

Referring to FIG. 3, a first conductive line 711 and a second conductive line 712 are formed on a film 700. The first conductive line 711 has a loop shape, and the second conductive line 712 has a spiral shape. The first conductive line 711 corresponds to a source coil SC, and the second conductive line 712 corresponds to a resonant coil RC. A line width and a length of each of the first and second conductive lines 711 and 712 may be adjusted variously.

In example embodiments, a capacitor may be connected between both ends of the second conductive line 712 corresponding to a resonant coil Lr10. Additionally, both ends of the second conductive line 712 corresponding to a resonant coil Lr10 may be electrically connected. When both ends of the second conductive line 712 corresponding to a resonant coil Lr10 are electrically connected, a capacitor Lr10 forming a parallel resonance circuit with the resonant coil Lr10 may be formed of parasite capacitance (or, self-capacitance) of the conductive line 712.

As described above, FIG. 3 illustrates an example of a source coil and a resonant coil in which the first conductive line 711 and the second conductive line 712 are formed on one of a top surface and a bottom surface of the film 700. However, the first conductive line 711 may be formed on one of the top surface and the bottom surface of the film 700, and the second conductive line 712 may be formed on the other of the top surface and the bottom surface of the film 700.

Figure 4:
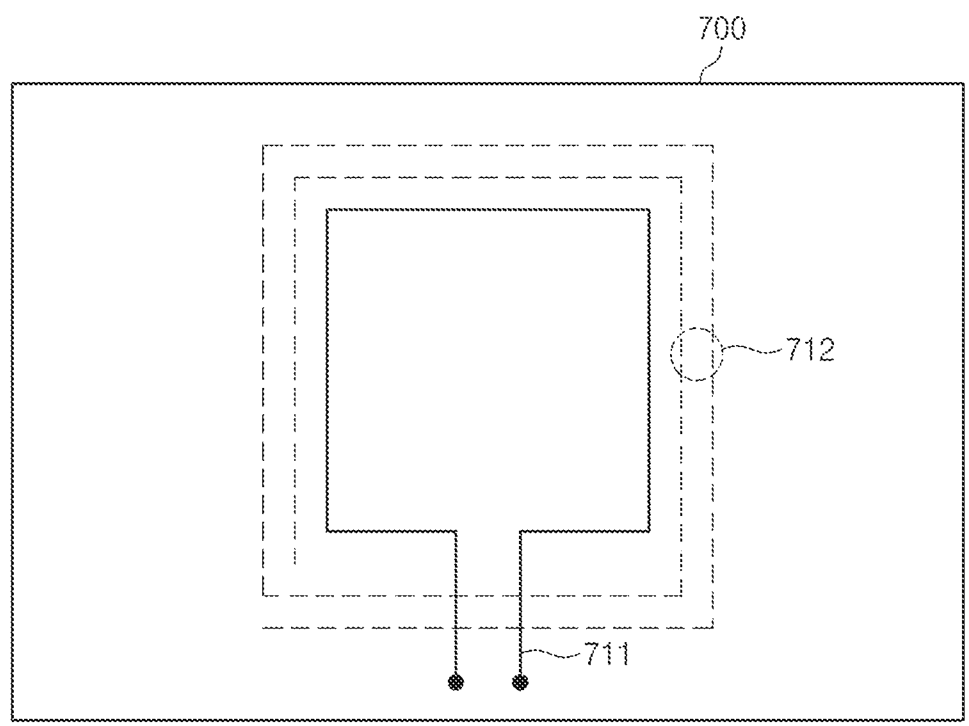

For example, referring to FIG. 4, the first conductive line 711 is formed on the top surface of the film 700, and the second conductive line 712 is formed on the bottom surface of the film 700. The first conductive line 711 has a loop shape, and the second conductive line 712 has a spiral shape.

Alternatively, the first conductive line 711 may be formed on the bottom surface of the film 700, and the second conductive line 712 may be formed on the top surface of the film 700.

The line width and length of each of the first and second conductive lines 711 and 712 may be adjusted variously.

In example embodiments, a capacitor may be connected between both ends of the second conductive line 712 corresponding to a resonant coil Lr10. Also, both ends of the second conductive line 712 corresponding to a resonant coil Lr10 may be electrically connected. When both ends of the second conductive line 712 corresponding to a resonant coil Lr10 are electrically connected, a capacitor Cr10 forming a parallel resonance circuit with the resonant coil Lr10 may be formed of parasite capacitance (or, self-capacitance) of the second conductive line 712.

As described above, in both FIGS. 3 and 4, the second conductive line 712 is formed of a conductive line. However, the second conductive line 712 may also be formed of at least two conductive lines.

Figure 5:
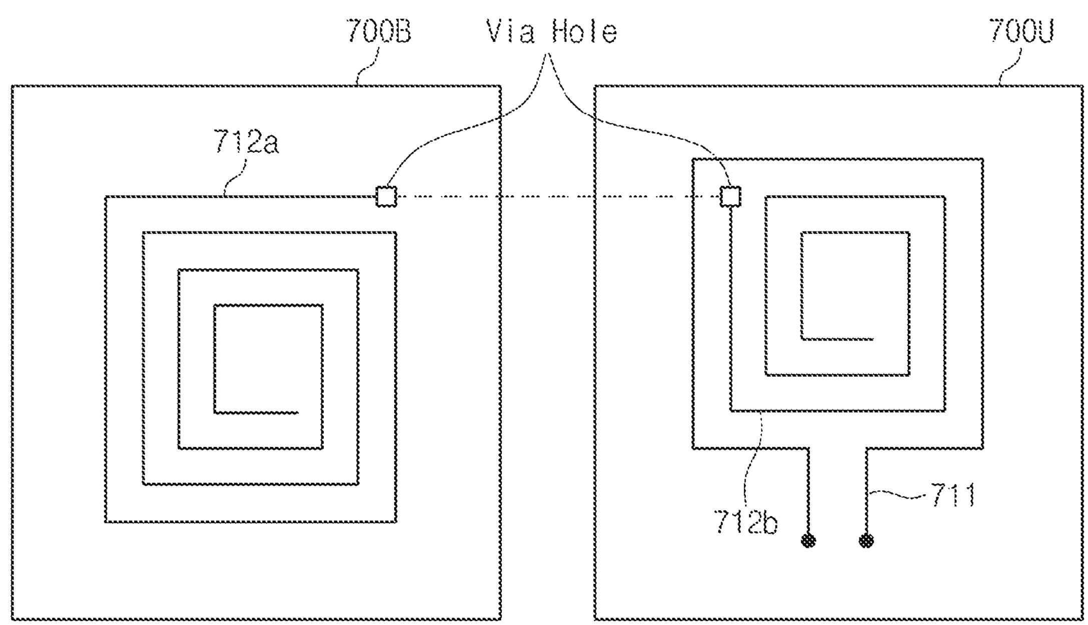

For example, referring to FIG. 5, a conductive line 712*a* is formed a bottom surface 700B of the film 700, and a conductive line 712*b* is formed on a top surface 700U of the film 700. In this case, the conductive lines 712*a* and 712*b* corresponding to a resonant coil Lr10 are electrically connected through a via hole penetrating the film 700. The first conductive line 711 has a loop shape, and each of the conductive lines 712*a* and 712*b* corresponding to the resonant coil Lr10 has a spiral shape.

In example embodiments, one end of the conductive line 712*a* and one end of the conductive line 712*b* may be directly connected, or may be electrically connected with a capacitor interposed between the one end of the conductive line 712*a* and one end of the conductive line 712*b*.

As described above, in FIG. 5, one of two conductive lines forming the second conductive line 712 is formed on a top surface/bottom surface of the film 700 and the other thereof is formed on a bottom surface/top surface of the film 700. However, two conductive lines forming the second conductive line 712 may also be formed on one of the top surface and the bottom surface of the film 700.

Figure 6:
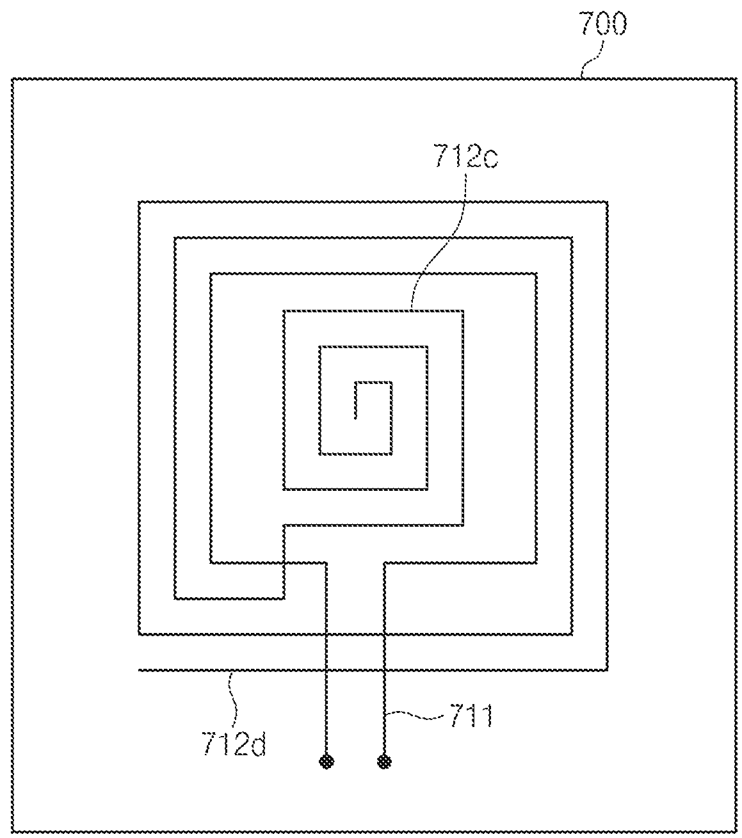

For example, referring to FIG. 6, two conductive lines 712*c* and 712*d* forming the second conductive line 712 are formed on a top surface/bottom surface of the film 700 on which the first conductive line 711 corresponding to the source coil Lc10 is formed.

In this case, one 712*c* of two conductive lines 712*c* and 712*d* forming the second conductive line 712 is formed within an inner space defined by the first conductive line 711, and the other thereof is formed outside the first conductive line 711.

The first conductive line 711 has a loop shape, and each of the conductive lines 712*c* and 712*d* corresponding to the resonant coil Lr10 has a spiral shape. One end of the conductive line 712*c* and 712*d* is electrically connected, and the other end thereof may be connected directly or with a capacitor interposed between the one end of the conductive line 712*a* and one end of the conductive line 712*b*.

As described above, in FIGS. 3 to 6, a source coil is formed of a single-loop coil. However, a source coil Ls10 can be formed by a multi-loop coil.

Figure 7:
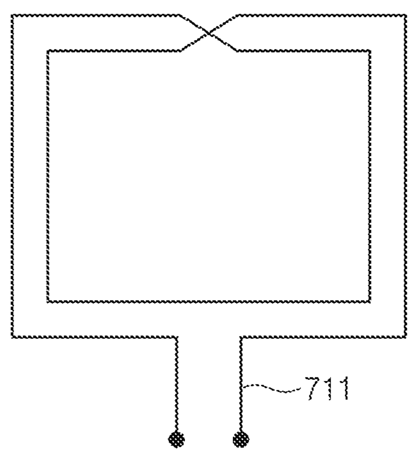
FIG. 7 is a diagram illustrating a source coil according to an embodiment of the present invention.

FIG. 7 is a diagram illustrating a source coil according to an embodiment of the present invention.

Referring to FIG. 7, a first conductive line 711 corresponding to the source coil Ls10 has two loops connected in series. The number of loops of the first conductive line 711 is not limited to this example. Source coils Ls10 illustrated in FIGS. 3 to 6 can be replaced with the source coil Ls10 illustrated in FIG. 7.

In example embodiments, an antenna structure is applicable to asymmetric and symmetric structures.

In example embodiments, if a source coil and a resonant coil are placed adjacent to each other, locations of the source coil and the resonant coil may not be limited. For example, the source coil may be formed on a battery, and the resonant coil may be formed on a case of a mobile device (or, a battery cover) adjacent to the battery.

Figure 8A:
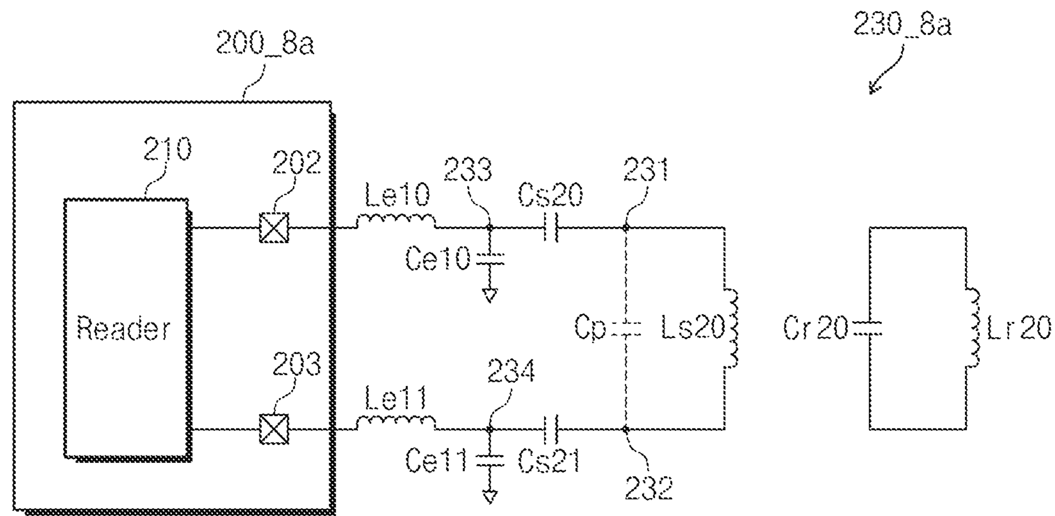
FIGS. 8A to 8D are diagrams schematically illustrating NFC antenna matching network systems according to embodiments of the present invention.

FIG. 8A is a diagram schematically illustrating an NFC antenna matching network system according to an embodiment of the present invention.

Referring to FIG. 8A, a smart NFC antenna matching network system 230_8*a* includes capacitors Ce10, Ce11, Cs20, Cs21, and Cr20 and inductors Le10, Le11, Ls20, and Lr20. The smart NFC antenna matching network system 230_8*a* is electrically connected with chip terminals 202 and 203 of an NFC transceiver 200_8*a*. In FIG. 8A, the NFC transceiver 200_8*a* includes a reader 210 connected with chip terminals 202 and 203.

The inductors Le10 and Le11 and the capacitors Ce10 and Ce11 constitute a filter (e.g., an ElectroMagnetic Compatibility (EMC) filter) for removing a harmonic wave of an NFC signal output from the reader 210. The inductor Le10 and the capacitor Cs20 are connected between a chip terminal 202 and an antenna node 231, and the capacitor Ce10 is connected between a connection node 233 between the inductor Le10 and the capacitor Cs20 and a reference potential (e.g., a ground voltage). The inductor Le11 and the capacitor Cs21 are connected between a chip terminal 203 and an antenna node 232, and the capacitor Ce11 is connected between a connection node 234 between the inductor Le11 and the capacitor Cs21 and a reference potential (e.g., a ground voltage).

The inductor Ls20 and the capacitors Cs20 and Cs21 constitute a serial resonator. Herein, the inductor Ls20 may be referred to as a source coil.

The capacitor Cr20 and the inductor Lr20 constitutes a parallel resonator. As illustrated in FIG. 8A, the parallel resonator formed by the capacitor Cr20 and the inductor Lr20 is physically separated from the serial resonator that is electrically connected with the chip terminals 202 and 203. Herein, the inductor Lr20 may be referred to as a resonant coil. The source coil Ls20 is physically separated from the resonant coil Lr20. That is, the resonant coil Lr20 is electrically floated from the source coil Ls20. The source coil Ls20 is supplied with power from the reader 210, and the resonant coil Lr20 is supplied with power from the source coil Ls20 through magnetic induction. The resonant coil Lr20 transmits or receives NFC signals by parallel resonance.

Because the smart NFC antenna matching network system 230_8*a* transmits and receives NFC signals under a condition where a serial resonator suitable for a transmission mode (i.e., advantageous to form a magnetic field) and a parallel resonator suitable for a reception mode (i.e., advantageous to be supplied with a power) are physically separated, the serial resonator and the parallel resonator do not influence each other in terms of impedance.

Further, because the resonant coil Lr20 is floated, impedance seen from the resonant coil Lr20 is low. Thus, a Quality (Q) factor may become high, and the strength of current induced at the resonant coil Lr20 (or, the strength of a magnetic field) may increase. Also, as the strength of current induced or the strength of a magnetic field increases, a recognition distance or a reception voltage increases.

In example embodiments, the capacitor Cr20 connected in parallel with the resonant coil Lr20 may be a lumped element or parasite capacitance parasitized on the resonant coil Lr20.

In example embodiments, as illustrated by a dotted line of FIG. 8A, a capacitor Cp may be connected in parallel between the antenna terminals 231 and 232. That is, the capacitor Cp may be selectively used.

Figure 8B:
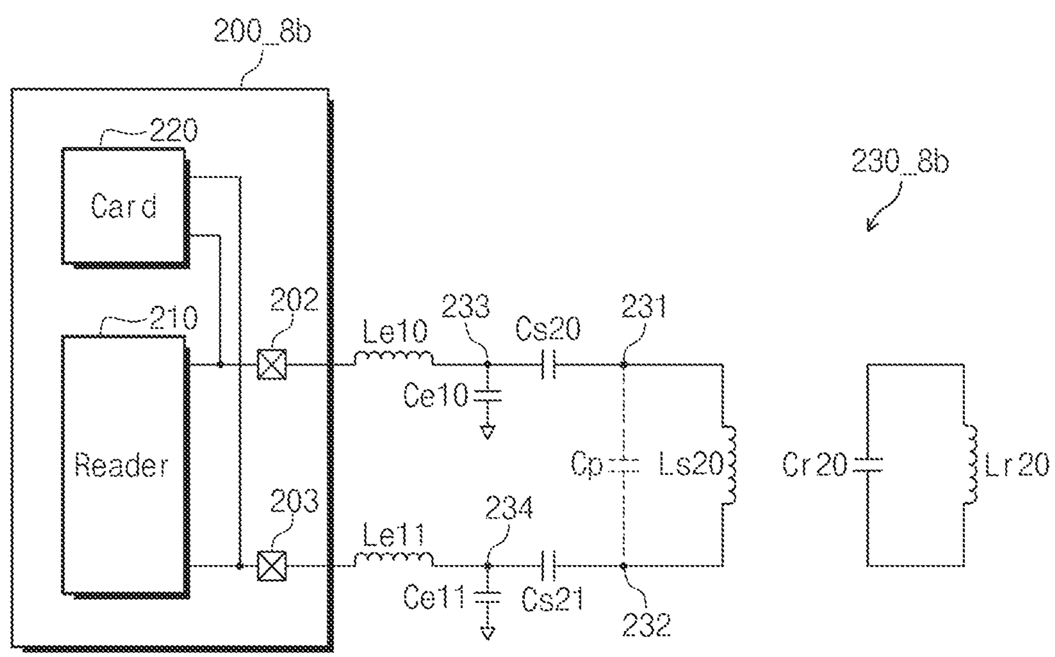

FIG. 8B is a diagram schematically illustrating an NFC antenna matching network system according to an embodiment of the present invention.

Referring to FIG. 8B, a smart NFC antenna matching network system 230_8*b* include capacitors Ce10, Ce11, Cs20, Cs21, and Cr20 and inductors Le10, Le11, Ls20, and Lr20. The capacitors Ce10, Ce11, Cs20, Cs21, and Cr20 and the inductors Le10, Le11, Ls20, and Lr20 are connected substantially the same as illustrated in FIG. 8A, and a detailed description thereof is thus omitted.

An NFC transceiver 200_8*b* includes a reader 210 and a card circuit 220. As described above in conjunction with FIG. 8A, the reader 210 is connected with a smart NFC antenna matching network system 230_8*b* through chip terminals 202 and 203. In a transmission mode of the NFC transceiver 200_8*b*, the reader 210 transmits NFC signals via the chip terminals 202 and 203, and in a reception mode of the NFC transceiver 200_8*b*, the reader 210 receives NFC signals via the chip terminals 202 and 203. Additionally, the card circuit 220 is connected with the smart NFC antenna matching network system 230_8*b* via the chip terminals 202 and 203. Thus, the NFC transceiver 200_8*b* is substantially the same as the NFC transceiver 200_8*a* illustrated in FIG. 8A, except that the card circuit 220 shares the chip terminals 202 and 203 with the reader 210.

Figure 8C:
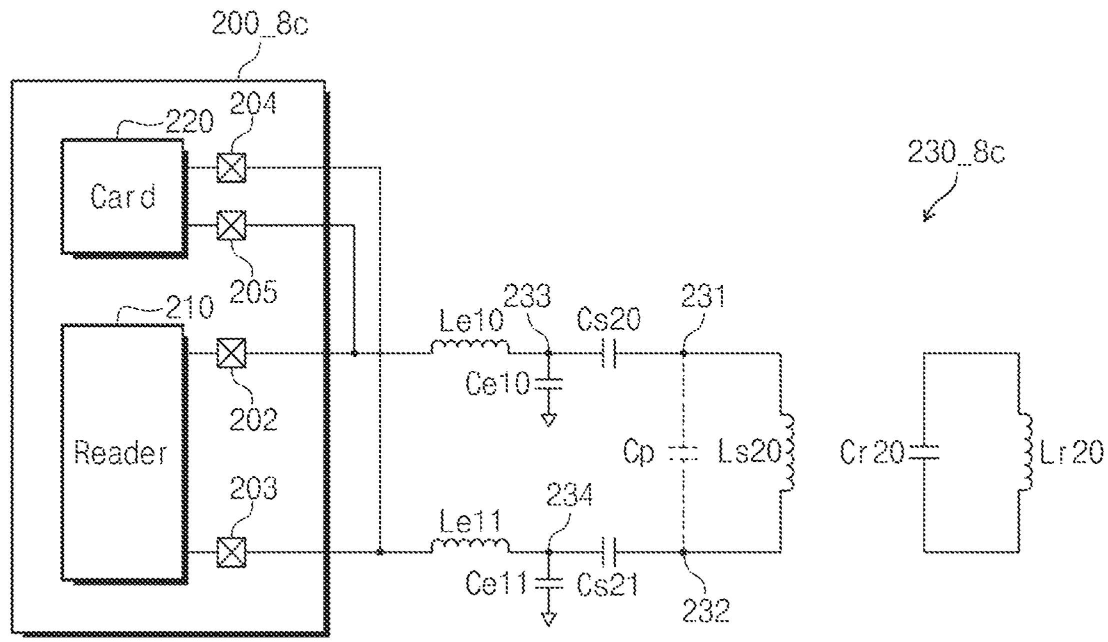

FIG. 8C is a diagram schematically illustrating an NFC antenna matching network system according to an embodiment of the present invention.

Referring to FIG. 8C, a smart NFC antenna matching network system 230_8*c* includes capacitors Ce10, Ce11, Cs20, Cs21, and Cr20 and inductors Le10, Le11, Ls20, and Lr20. The capacitors Ce10, Ce11, Cs20, Cs21, and Cr20 and the inductors Le10, Le11, Ls20, and Lr20 are connected substantially the same as illustrated in FIG. 8A, and a detailed description thereof is thus omitted.

An NFC transceiver 200_8*c* includes a reader 210 and a card circuit 220. As described in FIG. 8A, the reader 210 is connected with a smart NFC antenna matching network system 230_8*c* through chip terminals 202 and 203. In a transmission mode of the NFC transceiver 200_8*c*, the reader 210 transmits NFC signals via the chip terminals 202 and 203, and in a reception mode of the NFC transceiver 200_8*c*, the reader 210 receives NFC signals via the chip terminals 202 and 203. The card circuit 220 is connected with the smart NFC antenna matching network system 230_8*c* via chip terminals 204 and 205. Thus, the NFC transceiver 200_8*c* is substantially the same as the NFC transceiver 200_8*a* illustrated in FIG. 8A, except that the card circuit 220 and the reader 210 are connected with the NFC antenna matching network system 230_8*c* via independent chip terminals 202, 203, 204, and 205.

Figure 8D:
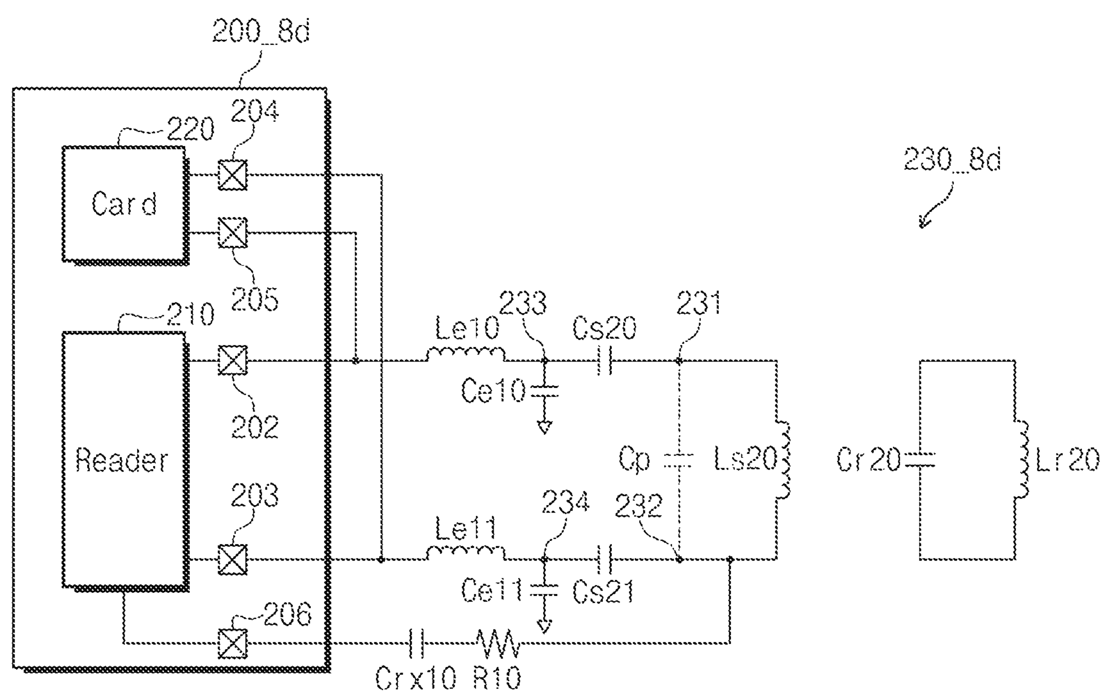

FIG. 8D is a diagram schematically illustrating an NFC antenna matching network system according to an embodiment of the present invention.

Referring to FIG. 8D, a smart NFC antenna matching network system 230_8*d* includes capacitors Ce10, Ce11, Cs20, Cs21, and Cr20 and inductors Le10, Le11, Ls20, and Lr20. The capacitors Ce10, Ce11, Cs20, Cs21, and Cr20 and the inductors Le10, Le11, Ls20, and Lr20 are connected substantially the same as illustrated in FIG. 8A, and a detailed description thereof is thus omitted.

An NFC transceiver 200_8*d* includes a reader 210 and a card circuit 220. The reader 210 is connected with the smart NFC antenna matching network system 230_8*d* through chip terminals 202, 203, and 206. In a transmission mode of the NFC transceiver 200_8*d*, the reader 210 transmits NFC signals via the chip terminals 202 and 203, and in a reception mode of the NFC transceiver 200_8*d*, the reader 210 receives NFC signals via the chip terminal 206. The card circuit 220 is connected with the smart NFC antenna matching network system 230_8*d* via chip terminals 204 and 205. A capacitor Crx10 and a resistor R10 are connected between the antenna terminal 232 and the chip terminal 206.

Although not illustrated, the resistors and/or inductors used to tune impedance matching, a bandwidth, and/or a Q factor are applicable to smart NFC antenna matching network systems in FIGS. 8A to 8D, as described with reference to FIG. 2E.

Further, in the NFC antenna matching network systems illustrated in FIGS. 8C and 8D, connection between the chip terminals 204 and 205 and a smart NFC antenna matching network system may be modified variously. For example, as described with reference to FIG. 2F, capacitors can be connected between the smart NFC antenna matching network system and the hip terminals 204 and 205.

Figure 9A:
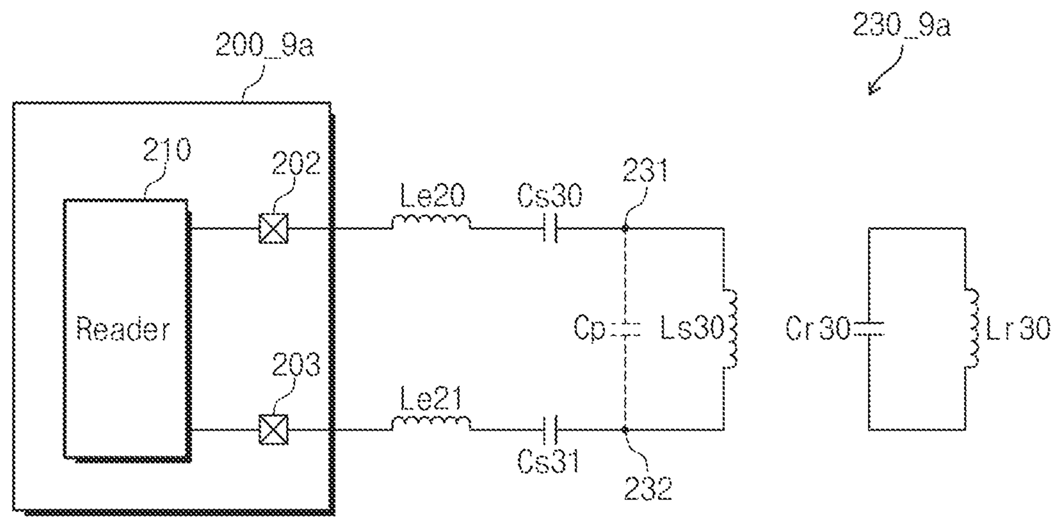
FIGS. 9A to 9D are diagrams schematically illustrating NFC antenna matching network systems according to embodiments of the present invention.

FIG. 9A is a diagram schematically illustrating an NFC antenna matching network system according to an embodiment of the present invention.

Referring to FIG. 9A, a smart NFC antenna matching network system 230_9*a* includes capacitors Cs30, Cs31, and Cr30 and inductors Le20, Le21, Ls30, and Lr30. The smart NFC antenna matching network system **230_9*a* is electrically connected with chip terminals 202 and 203 of an NFC transceiver 200_9**A.

In FIG. 9A, the NFC transceiver **200_9*a* includes a reader 210 connected with chip terminals 202 and 203. However, the NFC transceiver 200_9*a*** is not limited thereto.

The inductor Le20 and the capacitor Cs30 are connected between a chip terminal 202 and an antenna node 231, and the inductor Le21 and the capacitor Cs31 are connected between a chip terminal 203 and an antenna node 232. The inductor Ls30 and the capacitors Cs30 and Cs31 constitute a serial resonator. Herein, the inductor Ls30 may be referred to as a source coil. The capacitor Cr30 and the inductor Lr30 constitute a parallel resonator.

As illustrated in FIG. 9A, the parallel resonator formed by the capacitor Cr30 and the inductor Lr30 is physically separated from the serial resonator that is electrically connected with the chip terminals 202 and 203 Herein, the inductor Lr30 may be referred to as a resonant coil.

As described above, the source coil is physically separated from the resonant coil. That is, the resonant coil Lr30 is electrically floated from the source coil Ls30. The source coil Ls30 is supplied with power from the reader 210, and the resonant coil Lr30 is supplied with power from the source coil Ls30 through magnetic induction. The resonant coil Lr30 transmits or receives NFC signals through parallel resonance.

Because the smart NFC antenna matching network system **230_9*a*** transmits and receives NFC signals under a condition where a serial resonator suitable for a transmission mode (i.e., advantageous to form a magnetic field) and a parallel resonator suitable for a reception mode (i.e., advantageous to be supplied with a power) are physically separated, the serial resonator and the parallel resonator do not influence each other in terms of impedance.

Further, because the resonant coil Lr30 is floated, impedance seen from the resonant coil Lr30 is low. Thus, a Q factor increases, and the strength of current induced at the resonant coil Lr30 (or the strength of a magnetic field) increases. Additionally, as the strength of current induced or the strength of a magnetic field increases, a recognition distance or a reception voltage increases.

In example embodiments, the capacitor Cr30 connected in parallel with the resonant coil Lr30 may be a lumped element or parasite capacitance parasitized on the resonant coil Lr30.

In example embodiments, as illustrated by a dotted line of FIG. 9A, a capacitor Cp may be connected in parallel between the antenna terminals 231 and 232. That is, the capacitor Cp may be selectively used.

Figure 9B:
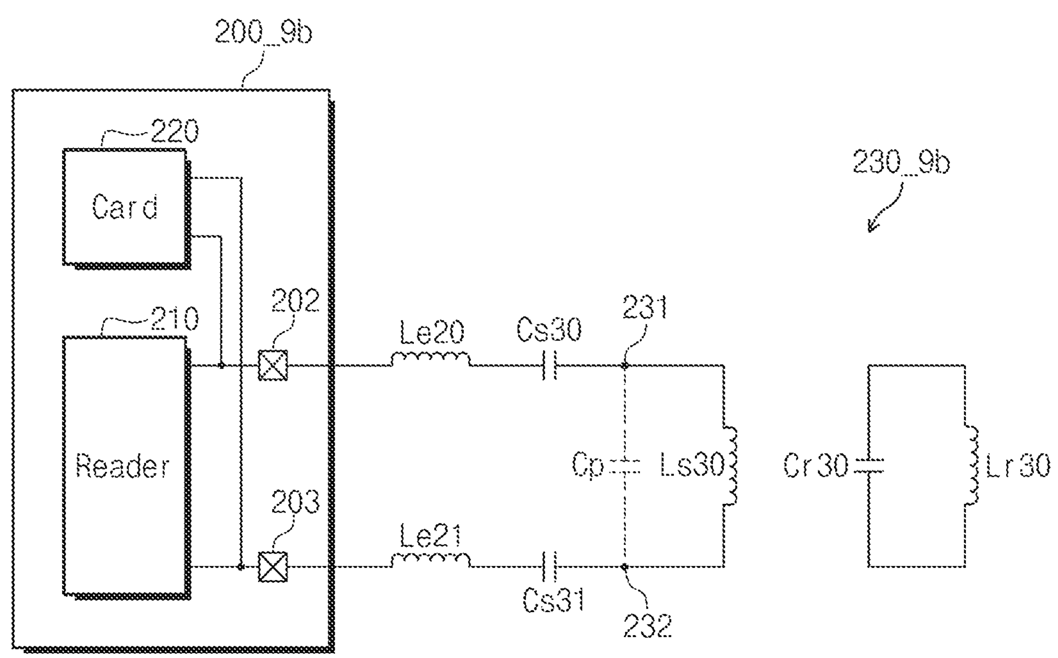

FIG. 9B is a diagram schematically illustrating an NFC antenna matching network system according to an embodiment of the present invention.

Referring to FIG. 9B, a smart NFC antenna matching network system **230_9*b* include capacitors Cs30, Cs31, and Cr30 and inductors Le20, Le21, Ls30, and Lr30. The capacitors Cs30, Cs31, and Cr30 and the inductors Le20, Le21, Ls30, and Lr30 are connected substantially the same as illustrated in FIG. 9**A, and a detailed description thereof is thus omitted.

An NFC transceiver **200_9*b* includes a reader 210 and a card circuit 220. As described in FIG. 9A, the reader 210 is connected with a smart NFC antenna matching network system 230_9*b* through chip terminals 202 and 203. In a transmission mode of the NFC transceiver 200_9*b*, the reader 210 transmits NFC signals via the chip terminals 202 and 203, and in a reception mode of the NFC transceiver 200_9*b*, the reader 210 receives NFC signals via the chip terminals 202 and 203**.

Additionally, the card circuit 220 is connected with the smart NFC antenna matching network system **230_9*b* via the chip terminals 202 and 203. Thus, the NFC transceiver 200_9*b* is substantially the same as the NFC transceiver 200_9*a* illustrated in FIG. 9A, except that the card circuit 220 shares the chip terminals 202 and 203 with the reader 210**.

Figure 9C:
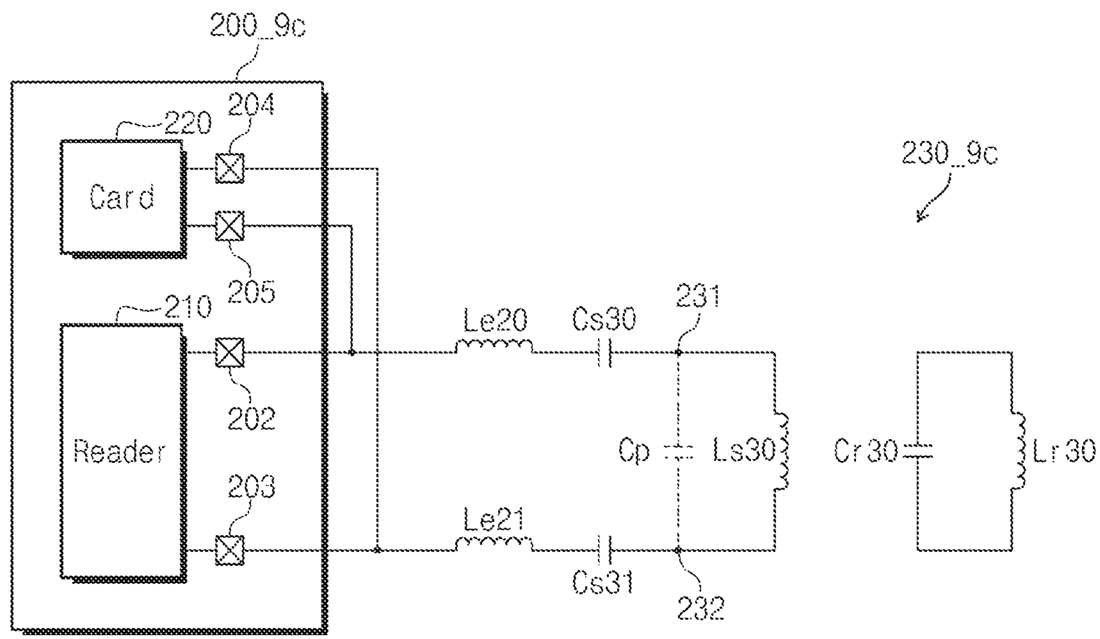

FIG. 9C is a diagram schematically illustrating an NFC antenna matching network system according to an embodiment of the present invention.

Referring to FIG. 9C, a smart NFC antenna matching network system **230_9*c* includes capacitors Cs30, Cs31, and Cr30 and inductors Le20, Le21, Ls30, and Lr30. The capacitors Cs30, Cs31, and Cr30 and the inductors Le20, Le21, Ls30, and Lr30 are connected substantially the same as illustrated in FIG. 9**A, and a detailed description thereof is thus omitted.

An NFC transceiver **200_9*c* includes a reader 210 and a card circuit 220. As described in FIG. 9A, the reader 210 is connected with a smart NFC antenna matching network system 230_9*c* through chip terminals 202 and 203. In a transmission mode of the NFC transceiver 200_9*c*, the reader 210 transmits NFC signals via the chip terminals 202 and 203, and in a reception mode of the NFC transceiver 200_9*c*, the reader 210 receives NFC signals via the chip terminals 202 and 203**.

The card circuit 220 is connected with the smart NFC antenna matching network system **230_9*c* via chip terminals 204 and 205. Thus, the NFC transceiver 200_9*c* is substantially the same as the NFC transceiver 200_9*a* illustrated in FIG. 9A, except that the card circuit 220 and the reader 210 are connected with the NFC antenna matching network system 2309*c* via independent chip terminals 202, 203, 204, and 205**.

Figure 9D:
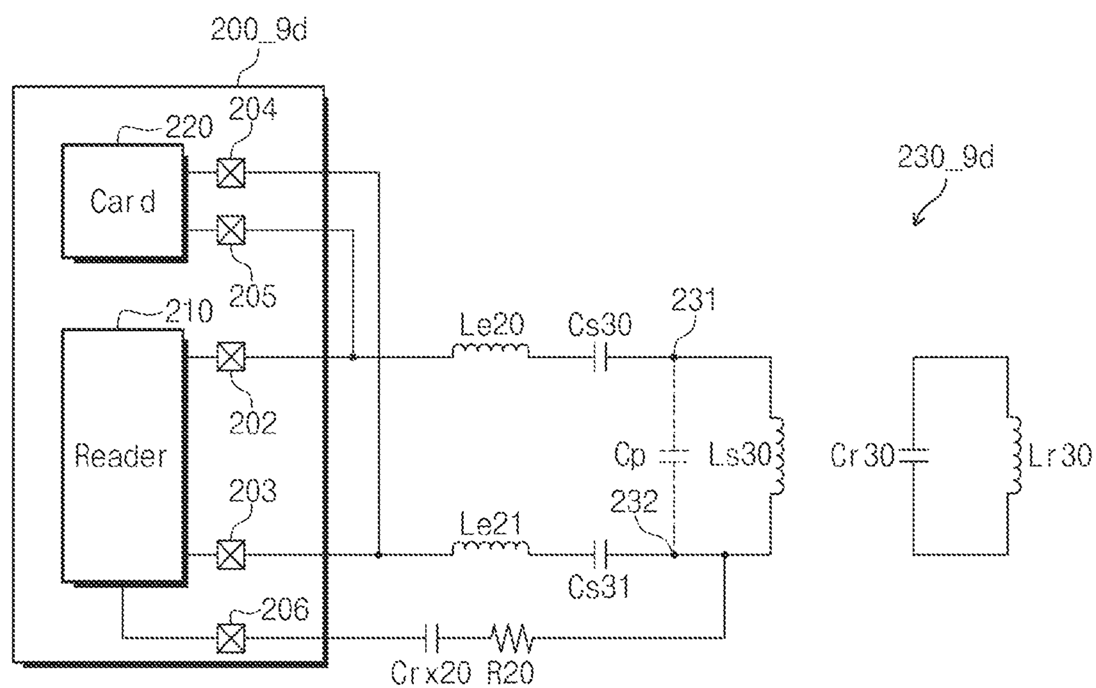

FIG. 9D is a diagram schematically illustrating an NFC antenna matching network system according to an embodiment of the present invention.

Referring to FIG. 9D, a smart NFC antenna matching network system **230_9*d* includes capacitors Cs30, Cs31, and Cr30 and inductors Le20, Le21, Ls30, and Lr30. The capacitors Cs30, Cs31, and Cr30 and the inductors Le20, Le21, Ls30, and Lr30 are connected substantially the same as illustrated in FIG. 9**A, and a detailed description thereof is thus omitted.

An NFC transceiver **200_9*d* includes a reader 210 and a card circuit 220. The reader 210 is connected with the smart NFC antenna matching network system 230_9*d* through chip terminals 202, 203, and 206. In a transmission mode of the NFC transceiver 200_9*d*, the reader 210 transmits NFC signals via the chip terminals 202 and 203, and in a reception mode of the NFC transceiver 200_9*d*, the reader 210 receives NFC signals via the chip terminal 206. The card circuit 220 is connected with the smart NFC antenna matching network system 230_9*d* via chip terminals 204 and 205. A capacitor Crx20 and a resistor R20 are connected between the antenna terminal 232 and the chip terminal 206**.

Although not illustrated, the resistors and/or inductors used to tune impedance matching, a bandwidth, and/or a Q factor are applicable to smart NFC antenna matching network systems in FIGS. 9A to 9D, as described with reference to FIG. 2E.

Additionally, in the NFC antenna matching network systems in FIGS. 9C and 9D, connection between the chip terminals 204 and 205 and a smart NFC antenna matching network system may be modified variously. For example, as described with reference to FIG. 2F, capacitors can be connected between the smart NFC antenna matching network system and the hip terminals 204 and 205.

Figure 10A:
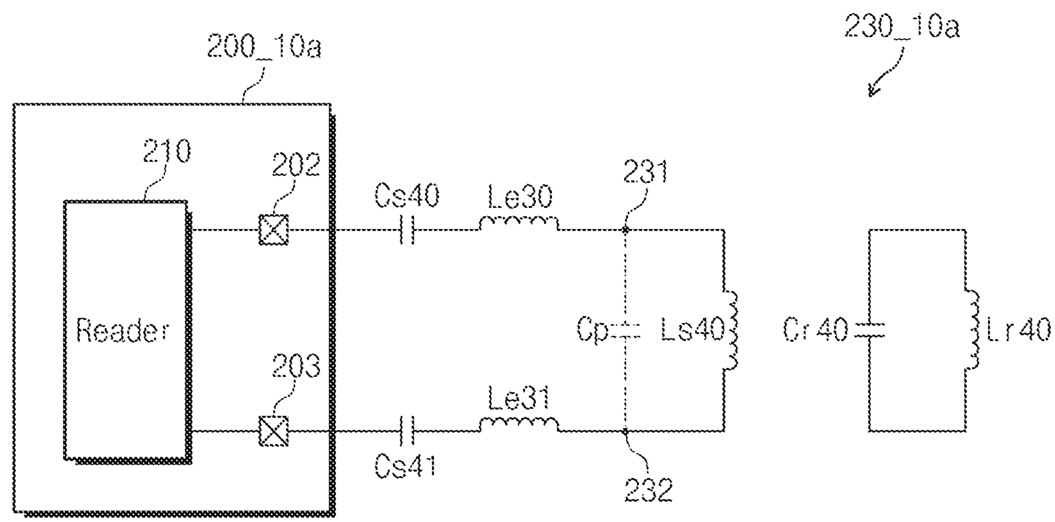
FIGS. 10A to 10D are diagrams schematically illustrating NFC antenna matching network systems according to embodiments of the present invention.

FIG. 10A is a diagram schematically illustrating an NFC antenna matching network system according to an embodiment of the present invention.

Referring to FIG. 10A, a smart NFC antenna matching network system 230_10*a* includes capacitors Cs40, Cs41, and Cr40 and inductors Le30, Le31, Ls40, and Lr40. The NFC antenna matching network system 230_10*a* is configured substantially the same as NFC antenna matching network system 230_9*a* illustrated in FIG. 9A, except for the locations of the capacitor Cs40 and the inductor Le30, and the locations of the capacitor Cs41 and the inductor Le31, and a description thereof is thus omitted.

Additionally, an NFC transceiver 200_10*a* is configured substantially the same as the NFC transceiver 200_9*a* illustrated in FIG. 9A, and a description thereof is thus omitted.

Figure 10B:
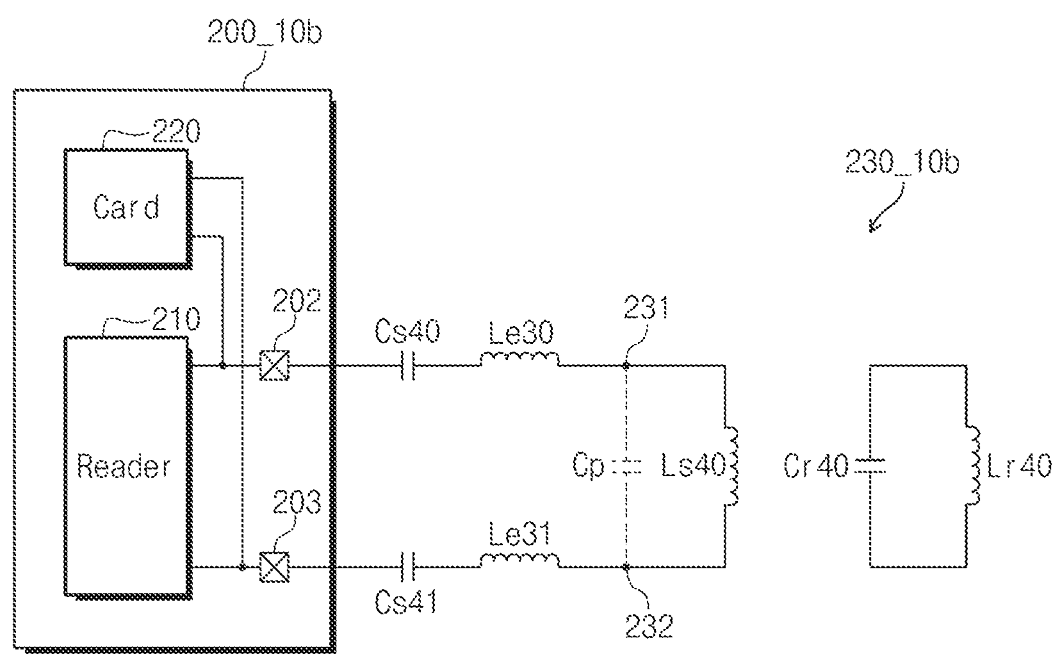

FIG. 10B is a diagram schematically illustrating an NFC antenna matching network system according to an embodiment of the present invention.

Referring to FIG. 10B, a smart NFC antenna matching network system 230_10*b* includes capacitors Cs40, Cs41, and Cr40 and inductors Le30, Le31, Ls40, and Lr40. The smart NFC antenna matching network system 230_10*b* is configured substantially the same as the NFC antenna matching network system 230_9*b* illustrated in FIG. 9B, except for the locations of the capacitor Cs40 and the inductor Le30 and the locations of the capacitor Cs41 and the inductor Le31, and a description thereof is thus omitted.

Additionally, an NFC transceiver 200_10*b* is configured substantially the same as the NFC transceiver 200_9*b* illustrated in FIG. 9B, and a description thereof is thus omitted.

Figure 10C:
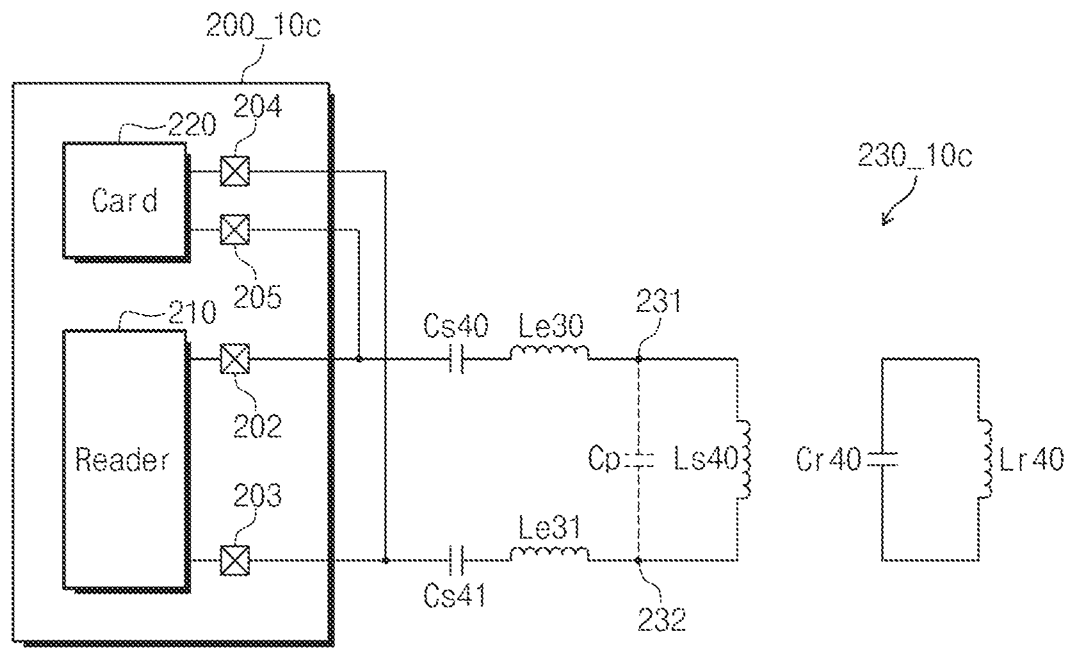

FIG. 10C is a diagram schematically illustrating an NFC antenna matching network system according to an embodiment of the present invention.

Referring to FIG. 10C, a smart NFC antenna matching network system 230_10*c* includes capacitors Cs40, Cs41, and Cr40 and inductors Le30, Le31, Ls40, and Lr40. The smart NFC antenna matching network system 230_10*c* is configured substantially the same as the NFC antenna matching network system 230_9*c* illustrated in FIG. 9C, except for the locations of the capacitor Cs40 and the inductor Le30 and the locations of the capacitor Cs41 and the inductor Le31, and a description thereof is thus omitted.

Additionally, an NFC transceiver 200_10*c* is configured substantially the same as the NFC transceiver 200_9*c* illustrated in FIG. 9C, and a description thereof is thus omitted.

Figure 10D:
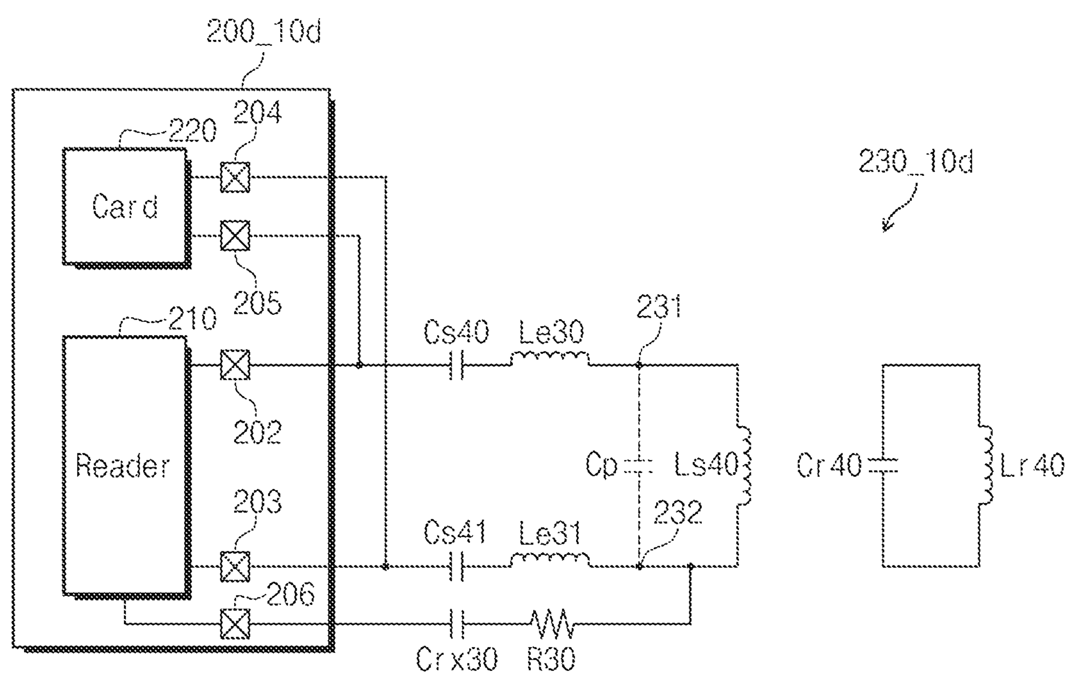

FIG. 10D is a diagram schematically illustrating an NFC antenna matching network system according to an embodiment of the present invention.

Referring to FIG. 10D, a smart NFC antenna matching network system 230_10*d* includes capacitors Cs40, Cs41, and Cr40 and inductors Le30, Le31, Ls40, and Lr40. The smart NFC antenna matching network system 230_10*d* is configured substantially the same as the NFC antenna matching network system 230_9*d* illustrated in FIG. 9D, except for the locations of the capacitor Cs40 and the inductor Le30 and the locations of the capacitor Cs41 and the inductor Le31, and a description thereof is thus omitted.

Additionally, an NFC transceiver 200_10*d* is configured substantially the same as the NFC transceiver 200_9*d* illustrated in FIG. 9D, and a description thereof is thus omitted. A capacitor Crx30 and a resistor R30 are connected in series between an antenna terminal 232 and a chip terminal 206.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A Near Field Communication (NFC) antenna matching network system that is connected with an NFC transceiver, the NFC antenna matching network system comprising:

a source coil connected between a first terminal and a second terminal of the NFC transceiver; and a resonant coil physically separated from the source coil, wherein the source coil comprises a first capacitor and a second capacitor connected in series between a first end and a second end of a pattern of the source coil and the first terminal and the second terminal, respectively, to decrease impedance, wherein the resonant coil comprises a third capacitor connected in parallel between both ends of a pattern of the resonant coil to increase impedance, wherein the patterns of the source and resonant coils are printed on a film regardless of upper and lower surfaces of the film, and wherein the source and resonant coils have opposite impedance characteristics.

2. The NFC antenna matching network system of claim 1, further comprising:

at least one of a first resistor and a first inductor connected in series between the first capacitor and the first end of the source coil; and at least one of a second resistor and a second inductor connected in series between the second capacitor and the second end of the source coil.

3. The NFC antenna matching network system of claim 1, further comprising at least one of a first resistor and a first inductor connected in series between the resonant coil and the third capacitor.

4. The NFC antenna matching network system of claim 1, wherein the resonant coil and the third capacitor constitute a parallel resonator, wherein the source coil, the first capacitor, and the second capacitor constitute a serial resonator, and wherein the parallel resonator is physically separated from the serial resonator.

5. The NFC antenna matching network system of claim 4, wherein the third capacitor comprises a lumped element.

6. The NFC antenna matching network system of claim 4, wherein the third capacitor comprises parasite capacitance of the resonant coil.

7. The NFC antenna matching network system of claim 1, further comprising a fourth capacitor connected in parallel with the source coil.

8. The NFC antenna matching network system of claim 1, further comprising:

a first filter coil connected between the first capacitor and the first terminal; and a second filter coil connected between the second capacitor and the second terminal.

9. The NFC antenna matching network system of claim 8, further comprising:

a fourth capacitor connected between a connection node of the first capacitor and the first filter coil and a reference potential; and a fifth capacitor connected between a connection node of the second capacitor and the second filter coil and the reference potential.

10. The NFC antenna matching network system of claim 1, further comprising:

a first filter coil connected between the source coil and the first capacitor; and a second filter coil connected between the source coil and the second capacitor.

11. The NFC antenna matching network system of claim 1, wherein the source coil is formed of a first conductive line having a single-loop or multi-loop shape, and wherein the resonant coil is formed of a second conductive line having a spiral shape.

12. The NFC antenna matching network system of claim 11, wherein the first and second conductive lines are formed on a surface of the film, and wherein the second conductive line surrounds a loop shape of the first conductive line.

13. The NFC antenna matching network system of claim 11, wherein the first and second conductive lines are formed on a surface of the film, wherein a first part of the second conductive line surrounds a loop shape of the first conductive line, and wherein a second part of the second conductive line is within an inner space defined by the loop shape of the first conductive line.

14. The NFC antenna matching network system of claim 11, wherein the first conductive line is formed on a first surface of the film, wherein a first part of the second conductive line is formed on a second surface of the film, and wherein a second part of the second conductive line is formed on the first surface of the film inside of a loop shape of the first conductive line and is connected with the first part of the second conductive line through a via hole penetrating the film.

15. A user device, comprising:

a Near Field Communication (NFC) transceiver; and an NFC antenna matching network system, wherein the NFC transceiver includes:

a first terminal;

a second terminal; and a reader that is connected to the first terminal and the second terminal, and wherein the NFC antenna matching network system includes:

a first capacitor having a first end connected with the first terminal;

a second capacitor having a first end connected with the second terminal;

a source coil connected between a second end of the first capacitor and a second end of the second capacitor; and a parallel resonator physically separated from the source coil.

16. The user device of claim 15, wherein the parallel resonator comprises:

a resonant coil; and a third capacitor connected between a first end and a second end of the resonant coil.

17. The user device of claim 16, wherein the source coil, the first capacitor, and the second capacitor constitute a serial resonator, and wherein the parallel resonator is physically separated from the serial resonator.

18. The user device of claim 17, further comprising a fourth capacitor connected in parallel with the source coil.

19. The user device of claim 16, further comprising:

a first filter coil connected between the first capacitor and the first terminal; and a second filter coil connected between the second capacitor and the second terminal.

20. The user device of claim 19, further comprising:

a fourth capacitor connected between a connection node of the first capacitor and the first filter coil and a reference potential; and a fifth capacitor connected between a connection node of the second capacitor and the second filter coil and the reference potential.

21. The user device of claim 16, further comprising:

a first filter coil connected between the source coil and the first capacitor; and a second filter coil connected between the source coil and the second capacitor.

22. A user device, comprising:

a Near Field Communication (NFC) transceiver; and an NFC antenna matching network system, wherein the NFC transceiver includes:

a first terminal;

a second terminal;

a reader that is connected with the first terminal and the second terminal; and a card circuit that is connected with the first terminal and the second terminal, wherein the NFC antenna matching network system includes:

a first capacitor having a first end connected with the first terminal;

a second capacitor having a first end connected with the second terminal;

a source coil connected between a second end of the first capacitor and a second end of the second capacitor; and a parallel resonator physically separated from the source coil, and wherein the parallel resonator includes:

a resonant coil; and a third capacitor connected between a first end and a second end of the resonant coil.

23. The user device of claim 22, further comprising:

a first filter coil connected between the first capacitor and the first terminal; and a second filter coil connected between the second capacitor and the second terminal.

24. The user device of claim 23, further comprising:

a fourth capacitor connected between a connection node of the first capacitor and the first filter coil and a reference potential; and a fifth capacitor connected between a connection node of the second capacitor and the second filter coil and the reference potential.

25. The user device of claim 22, further comprising:

a first filter coil connected between the source coil and the first capacitor; and a second filter coil connected between the source coil and the second capacitor.

26. A user device, comprising:

a Near Field Communication (NFC) transceiver; and an NFC antenna matching network system, wherein the NFC transceiver includes:

a first terminal;

a second terminal;

a third terminal;

a fourth terminal;

a reader connected with the first terminal and the second terminal; and a card circuit connected with the third terminal and the fourth terminal, wherein the NFC antenna matching network system includes:

a first capacitor having a first end connected with the first terminal and the third terminal;

a second capacitor having a first end connected with the second terminal and the fourth terminal;

a source coil connected between a second end of the first capacitor and a second end of the second capacitor; and a parallel resonator physically separated from the source coil, and wherein the parallel resonator includes:

a resonant coil; and a third capacitor connected between a first end and a second end of the resonant coil.

27. The user device of claim 26, further comprising:

a first filter coil connected between the first capacitor and the first terminal; and a second filter coil connected between the second capacitor and the second terminal.

28. The user device of claim 27, further comprising:

a fourth capacitor connected between a connection node of the first capacitor and the first filter coil and a reference potential; and a fifth capacitor connected between a connection node of the second capacitor and the second filter coil and the reference potential.

29. The user device of claim 26, further comprising:

a first filter coil connected between the source coil and the first capacitor; and a second filter coil connected between the source coil and the second capacitor.

30. A user device, comprising:

a Near Field Communication (NFC) transceiver; and an NFC antenna matching network system, wherein the NFC transceiver includes:

a first terminal;

a second terminal;

a third terminal;

a fourth terminal;

a fifth terminal;

a reader connected with the first terminal, the second terminal, and the third terminal; and a card circuit connected with the fourth terminal and the fifth terminal, wherein the NFC antenna matching network system includes:

a first capacitor having a first end connected with the first terminal and the fourth terminal;

a second capacitor having a first end connected with the second terminal and the fifth terminal;

a source coil having a first end connected with a second end of the first capacitor, and having a second end connected with a second end of the second capacitor and the third terminal; and a parallel resonator physically separated from the source coil, and wherein the parallel resonator includes:

a resonant coil; and a third capacitor connected between a first end and a second end of the resonant coil.

31. The user device of claim 30, further comprising:

a first filter coil connected between the first capacitor and the first terminal; and a second filter coil connected between the second capacitor and the second terminal.

32. The user device of claim 31, further comprising:

a fourth capacitor connected between a connection node of the first capacitor and the first filter coil and a reference potential; and a fifth capacitor connected between a connection node of the second capacitor and the second filter coil and the reference potential.

33. The user device of claim 30, further comprising:

a first filter coil connected between the source coil and the first capacitor; and a second filter coil connected between the source coil and the second capacitor.

* * * * *